Jan. 12, 1960     K. W. KLEIN ET AL     2,921,149
SEVEN-DAY TIME CONTROL SWITCH
Filed Jan. 24, 1957     2 Sheets-Sheet 1
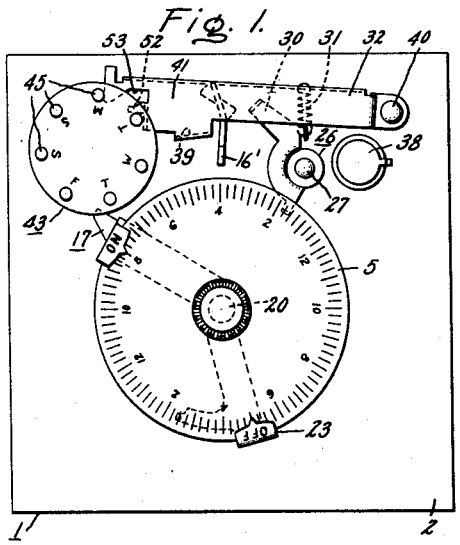
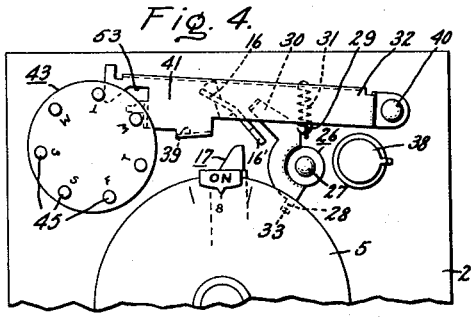
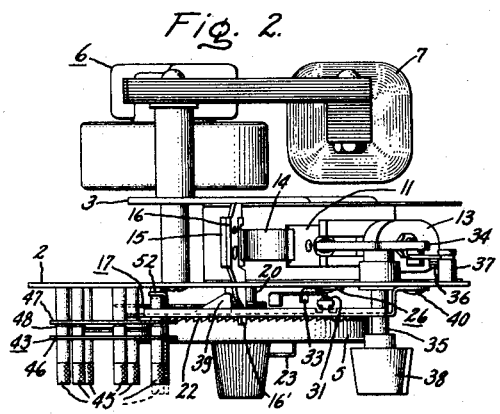
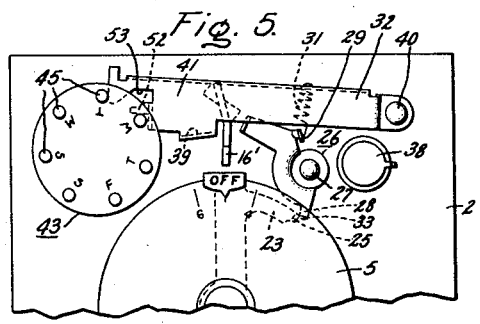
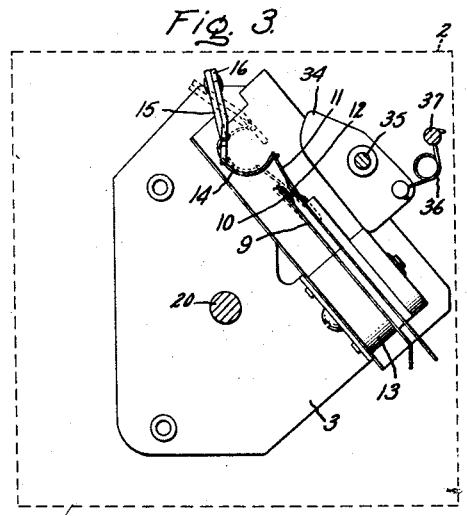
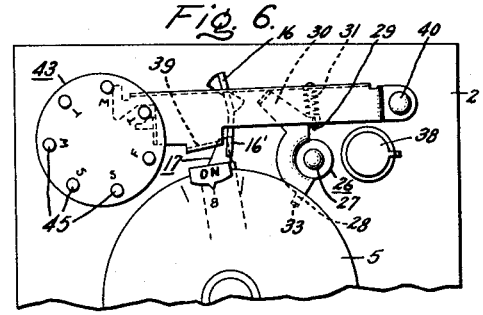
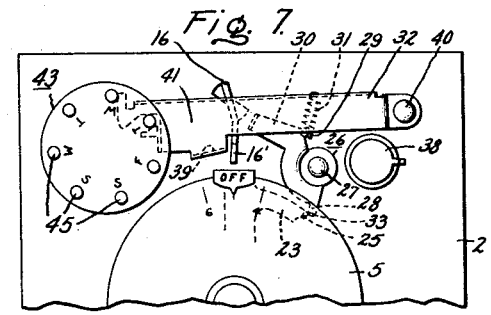
*Inventors:*
*Keith W. Klein,*
*Henry L. Mutti,*
*by Leonard J. Platt*
*Their Attorney.*

Jan. 12, 1960 K. W. KLEIN ET AL 2,921,149
SEVEN-DAY TIME CONTROL SWITCH
Filed Jan. 24, 1957 2 Sheets-Sheet 2
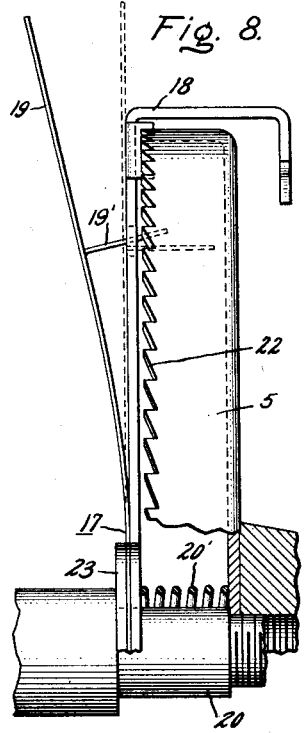
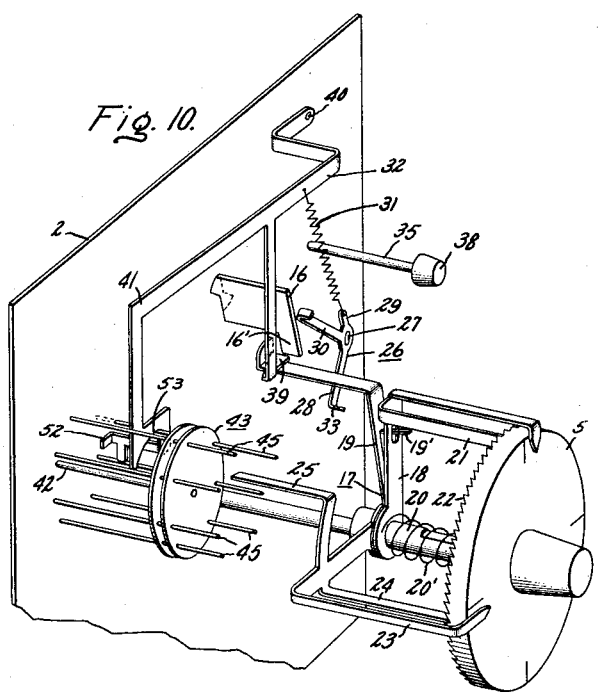
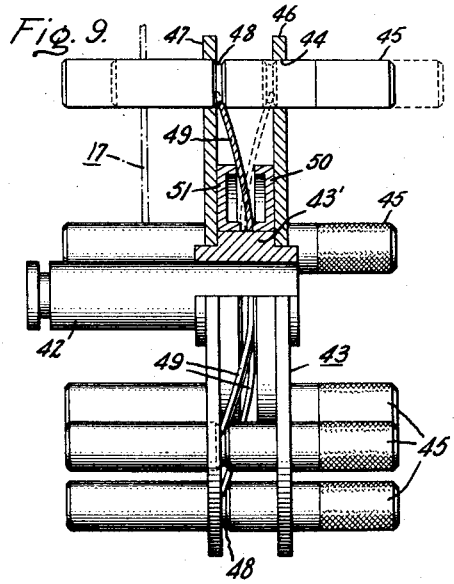
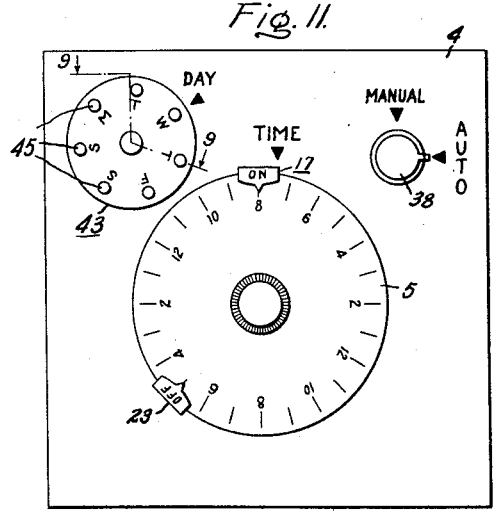
Inventors:
Keith W. Klein,
Henry L. Mutti,
by Leonard J Platt
Their Attorney.

2,921,149

SEVEN-DAY TIME CONTROL SWITCH

Keith W. Klein, Hopkinton, and Henry L. Mutti, Westboro, Mass., assignors to General Electric Company, a corporation of New York Application January 24, 1957, Serial No. 636,174

8 Claims. (Cl. 200—38)

This invention relates to time control devices and more particularly to switch means actuated as a function of time.

In U.S. patent application Serial No. 546,728, Klein, assigned to the same assignee as the present invention, there is described a type of time control switch particularly adapted to turn apparatus such as an air conditioner "on" and "off" at preset times each day. In that timer, provision is made for skipping "on" switch actuation for a day or days by setting the timer on the day immediately preceding the day or days to be skipped.

This invention is also concerned with that type timer and has as its general object the provision of a new and improved mechanism for skipping or omitting switch actuation.

It is another object of this invention to provide a time control switch which can be preset days in advance to omit "on" operation of the switch on any day or any number of days in any desired combination, thus eliminating the necessity of setting the timer on the day immediately preceding the day or days to be skipped.

It is a further object of this invention to provide a time control switch on which a weekly cycle of operation can be preset to be repeated week after week until a change is made in the setting.

In accordance with one aspect of this invention, a control lever is continuously rotated in a path as a function of time by a timing device. Upon each rotation of the control lever in its path, the control lever actuates a switch lever to close a switch at a preset time. When it is desired to omit "on" switch actuation, a cam is positioned in the path of the control lever in order to divert the control lever out of its path to thereby prevent the control lever from actuating the switch lever to close the switch. In this manner, the cam co-operates with the control lever to skip or omit switch actuation.

In accordance with a further aspect of this invention, the cam is fixed to a cam lever and automatic means is provided for moving the cam into the path of the control lever on preselected days. This mechanism comprises a plurality of operating pins mounted on a disc. The control lever is caused to index this disc once each day to permit the cam lever to selectively engage a different one of the operating pins each time the disc is indexed from one day position to the next succeeding day position. Each of the operating pins is manually movable to an inner position or an outer position. When an operating pin is located in its inner position, a first stop on the cam lever engages the operating pin to hold the cam out of the path of the control lever, thus permitting the control lever to actuate the switch lever at the preset time. On the other hand, when an operating pin is located in its outer position, the operating pin is out of the way of the first stop on the cam lever, and a second stop on the cam lever engages the operating pin to position the cam in the path of the control lever. Accordingly, at the preset time, the cam diverts the control lever out of its path to thereby prevent the control lever from actuating the switch lever. By this arrangement, each of the operating pins on the disc may be preset to omit "on" operation of the switch on any day or any number of days in any desired combination. The cycle will be repeated until a change is made in the setting of the pins. It is not necessary to set the timer on the day immediately preceding the day or days to be skipped.

Further objects and advantages of our invention as well as other modifications and uses thereof will become apparent as the description proceeds. Our invention will be better understood by reference to the accompanying drawing in which:

Fig. 1 is a front elevational view of a time switch with the control lever just about to engage an operating pin to index the operating pin disc from one position to the next succeeding position;

Fig. 2 is a top plan view of the time switch mechanism;

Fig. 3 is a partial front elevational view of the switch showing the switch in the "off" position;

Fig. 4 is a partial front elevational view showing the switch control mechanism just after the "on" control lever has moved the switch lever to the "on" position;

Fig. 5 is a partial front elevational view showing the components in a different operative position, just after the "off" control lever has rotated a pivoted lever to move the switch lever to the "off" position;

Fig. 6 is a partial front elevational view of the switch mechanism showing the cam deflecting the "on" control lever rearwardly to thereby prevent the "on" control lever from actuating the switch lever;

Fig. 7 is a partial front elevational view of the switch mechanism showing the switch lever in the "off" position and the "off" control lever about to rotate the pivoted lever;

Fig. 8 is an enlarged detail view showing the improved flexible "on" control lever mechanism;

Fig. 9 is an enlarged side elevational view partly in section taken on line 9—9 of Fig. 11 showing the improved disc and operating pin arrangement;

Fig. 10 is an exploded perspective view of the improved switch mechanism; and

Fig. 11 is a front elevational view of the improved time switch mechanism.

Referring now to the drawing and first, particularly to Fig. 1, the time control device of this invention is shown as comprising a generally square casing 1 suitable for mounting in any desired manner in an apparatus such as an air conditioner (not shown). This mechanism comprises a supporting structure including a front plate 2, and a rear plate 3. As shown in Fig. 11, a suitable cover or indicia plate 4 may be mounted in front of front plate 2 in order to conceal portions of the operating mechanism.

The improved time switch is also provided with a continuously rotatable time-of-day dial 5 mounted for movement over the cover plate 4 and driven by a conventional timing device gear train. To indicate hours of the day, dial 5 is graduated in a counterclockwise direction from twelve noon to twelve midnight through 180 degrees of the dial surface and through the remainder of the dial surface the graduations extend from twelve midnight to twelve noon. A suitable legend such as "Time," for example, may be painted or otherwise formed on cover plate 4 for pointing to the time of day indicated by rotatable dial 5.

As shown in Fig. 2, the timing device may include any suitable form of timer motor here shown as a self-starting synchronous motor 6, a field coil 7 of which is connected to a source of regulated frequency alternating current. The rotatable dial 5 is driven by motor 6 through suitable gearing (not shown).

A two-position switch which may be utilized to control apparatus such as an air conditioner, is provided for actuation by the improved control mechanism. In the arrangement illustrated in Fig. 3, the switch comprises a relatively fixed switch blade 9 carrying a switch contact 10, and a movable switch blade 11 carrying a contact 12. The switch blades are mounted on an insulator 13 in a manner well-known in the art. To provide for snap action, a U-shaped toggle spring 14 has one end thereof pivotally secured to an end of movable switch blade 11 and the other end thereof pivotally engaged with a dielectric plate 15 which in turn is rigidly fixed to a pivoted switch actuator lever 16. As shown in Fig. 2, switch lever 16 is pivoted between front plate 2 and rear plate 3 and has a portion thereof extending forwardly of the front plate 2 for co-operation with the improved control mechanism in a manner to be more fully described hereinafter. As viewed in Fig. 3, when switch lever 16 is rotated clockwise from the dotted line position shown in Fig. 3 to the solid line position shown in Fig. 3, the end of toggle spring 14 attached to dielectric plate 15 overcenters the end of toggle spring 14 which is attached to the movable switch blade 11 and the switch is snapped to the open position as shown in Figs. 3, 5, 6, 7 and 10.

Timed means is provided for actuating switch lever 16. In the arrangement illustrated, this means comprises an "on" control lever 17 which is adjustably mounted around the circumference of dial 5. As shown in Figs. 8 and 10, control lever 17 comprises two levers 18 and 19, respectively, both of which are preferably pivoted at one of their ends to a shaft 20. A spring 20' resiliently retains the control levers in position on shaft 20. An "on" pointer is formed integrally with the other end of lever 18 for indicating the time when it is desired to have the switch closed. In order to adjustably fix lever 17 to dial 5, a pawl 21 is formed integrally with lever 18 for engagement with ratchet means 22 formed on the underside of dial 5. Thus, to change the position of control lever 17 with respect to dial 5, it is merely necessary to press inwardly on the "on" pointer to disengage pawl 21 from ratchet 22 and then rotate the "on" pointer to the desired time. Lever 19 is flexible and is keyed at 19' to lever 18 so as to have limited inward and outward movement with respect to lever 18 in order to accomplish a unique function to be more fully described hereinafter. The end of control lever 17 extends some distance radially outwardly from the edge of dial 5 and is therefore able to contact switch lever 16 which is positioned in the path thereof. Accordingly, at the time preselected by the "on" pointer, control lever 17 may abut the end of switch lever 16 to move the switch lever from the position shown in Fig. 5 to the position shown in Fig. 4 to thereby close the switch.

The mechanism for opening the switch to turn the switch off comprises an "off" control lever 23. Lever 23 is provided with a pawl 24 for adjustably fixing the lever to dial 5. Lever 23 is also provided with an inwardly directed projection 25 which is located radially inwardly from the edge of dial 5 for contact with a furcated lever 26 to move the switch to the "off" position. As shown in Fig. 5, furcated lever 26 is pivoted at 27 to front plate 2. This lever 26 is provided with two opposed arms 28 and 29, respectively. Extending laterally from the intersection of these arms is a third arm 30 for engagement with switch actuator lever 16. A spring 31 is connected at one end thereof to arm 29 and at the other end thereof to a cam lever 32 in order to bias the furcated lever 26 to the position shown in Fig. 4. Cam lever 32 will be more fully described hereinafter. Arm 28 of furcated lever 26 is provided with an upwardly extending projection 33 for co-operating with downwardly extending projection 25 formed on "off" lever 23. When disc 5 and "off" lever 23, which is carried thereby, are rotated clockwise by the timing mechanism 6, downwardly extending projection 25 of lever 23 will contact upwardly extending projection 33 to thereby cause counterclockwise rotation of the furcated lever 26. If switch lever 16 is in the "on" position shown in Fig. 4, this will cause arm 30 to abut switch lever 16 to rotate the switch lever clockwise to the "off" position shown in Fig. 5. On the other hand, if switch lever 16 is already on the "off" position, the "off" control lever 23 will merely rotate furcated lever 26, and lever 26 will not touch switch lever 16. Continued rotation of "off" lever 23 with respect to lever 26 will cause lever 26 to become disengaged from projection 25 and spring 31 will cause lever 26 to snap back to the position shown in Fig. 4.

Manual means is provided for completely overriding the automatic mechanism for operating the switch. In the arrangement illustrated in Fig. 3, this manual means may comprise an insulated plate 34 fixed to a rotatable shaft 35. A spring 36 is connected at one end thereof to insulated plate 34 and at the other end thereof to a lug 37 fixed to front plate 2 in order to bias insulated plate 34 to the inactive position shown in Fig. 3. As shown in Fig. 10, a knob 38 may be connected to shaft 35 for rotating insulated plate 34 against the force of spring 36 to move an extremity of insulated plate 34 against a side surface of movable switch blade 11 to thereby close the switch.

A uniquely designed mechanism is provided for skipping or omitting "on" switch actuation at the time preset by the "on" control lever 17. In the arrangement illustrated, this improved mechanism comprises a rearwardly directed triangular cam 39 which may be selectively positioned in the path of control lever 17 for diverting the control lever out of its path. At this point, it may be desirable to look a little more closely at the shape of that portion of switch lever 16 which extends forwardly of front plate 2. As shown in Fig. 10, it can be seen that the end portion of switch lever 16 is generally L-shaped with an arm 16' thereof spaced from the front face of front plate 2. This arm 16' is positioned in the path of control lever 17. When cam 39 is placed in the path of control lever 17 in front of arm 16', the cam causes the control lever to pass behind arm 16' to thereby prevent the control lever from actuating switch lever 16, at the time preselected by the "on" pointer. It can be seen that as the control lever is rotated into contact with cam 39, the cam urges lever 19 rearwardly away from lever 18. Key connection 19' between levers 18 and 19 causes these levers to continue to rotate in unison.

As shown in Figs. 4 and 10, cam 39 may be formed integrally with cam lever 32. Cam lever 32 is pivoted at one end 40 thereof to front plate 2. A free end 41 of cam lever 32 may be moved upwardly to pivot the cam lever 32 about its pivot 40 to remove the cam from the path of control lever 17, or downwardly about pivot 40 to place cam 39 into the path of control lever 17 in order to prevent the control lever from actuating switch lever 16 to the "on" position. Thus, it can be seen that an easily manufactured cam 39 may be merely pivoted into the path of a control lever in order to omit "on" switch actuation.

An improved mechanism is provided for selectively placing cam 39 into the path of control lever 17 according to a prearranged cycle of operation. Rotatably mounted on a stud shaft 42 spaced to one side of dial 5 is a disc 43. Disc 43 is provided with seven circumferentially arranged bores 44 near its periphery. An operating pin 45 is positioned within each of the bores for each day of the week and the pins may be designated as M, T, W, T, F, etc., in sequence. As shown in Fig. 9, the disc comprises two longitudinally spaced concentrically arranged circular plates 46 and 47. Unique means is provided for holding the operating pins 45 in an inner or an outer position. As shown in Fig. 9, each pin is provided with an annular groove 48 for receiving one end of a leaf spring 49. The other end of each spring 49 engages a hub 43' of disc 43. Spacers 50 and 51 are fixed to hub 43' for bowing springs 49. The pressure of each spring holds its respective pin in an inner or outer position and provides a snap action when the pin is pushed in or pulled out in setting. This snap action is provided by the interference of the edges of the spacers and the surface of the spring as the pin is moved in or out, forcing the spring to always bow to the opposite side to which the pin end is placed.

As shown in Fig. 10, the free end of cam lever 32 is provided with a unique stop means for sequentially cooperating with a selected one of operating pins 45 to either hold cam 39 out of the path of control lever 17 or place cam 39 into the path of control lever 17. First stop means in the form of a rearwardly extending generally L-shaped arm 52 is provided on the lower portion of the free end 41 of cam lever 32 for contacting the inner end of an operating pin when such pin 45 is in its inner position to thereby hold cam 39 up out of the path of control lever 17. As shown in Fig. 5, the lower portion of L-shaped arm 52 contacts the upper portion of the inner end of operating pin 45. A second stop means in the form of a notch 53 is provided in the upper portion of the free end 41 of lever 32 and is disposed upwardly and forwardly of stop 52 for contacting an operating pin when such pin is in its outer position. Stop 52 is disposed too far rearwardly to contact an operating pin when such pin is pulled to its extreme outer position. As shown in Figs. 6 and 10, when the upper edge of an operating pin is engaged by stop notch 53, cam 39 on lever 32 is positioned in the path of control lever 17, and thus, prevents control lever 17 from actuating switch lever 16.

Timed means is provided for indexing disc 43 to permit cam lever 32 to engage each operating pin 45 in succession. In the arrangement illustrated in Fig. 1, it can be seen that this important indexing function is also performed by the uniquely designed and spaced control lever 17. Disc 43 is disposed so that a pin in the second quadrant thereof is engaged by control lever 17 during a portion of each rotation of control lever 17 so that the disc is moved one-seventh of a rotation for each complete rotation of control lever 17. Disc 43 is thus caused to rotate through a complete cycle in a week and each operating pin is adapted to control the operation of the cam lever 32 during a particular day. Referring now to Figs. 1 and 4, it can be seen that as control lever 17 is rotated clockwise, it will engage Thursday pin T to rotate disc 43 counterclockwise, thus causing Tuesday pin T which is shown as being in engagement with stop 52, to lift cam lever 32 against the tension of spring 31 and then allow the cam lever stop 52 to drop onto the next day operating pin W as shown in Fig. 4.

*Operation*

The operation of the improved switch is as follows: The "On" and "Off" control levers 17 and 23, respectively are set on the twenty-four hour dial 5 at the time it is desired for the switch to be turned "on" and "off" respectively, and the dial 5 is set to indicate the correct time of day at the "Time" mark on the cover plate. The desired program is set up on week disc 43 by pulling the particular day operating pin to the outermost position for the days on which "on" operation is to be omitted and pushing the operating pin to the innermost position for the days on which "on" operation is desired. The week dial is set to indicate the correct day of the week at the time of setting by rotating disc 43 so that the day marked on disc 43 corresponding to the day of the week at the time of setting, is positioned opposite to the word "Day" located on cover plate 2. The time switch will then operate the controlled apparatus in the selected cycle until a change in setting is made.

If, for example, at approximately ten o'clock Tuesday evening it is desired to have the air conditioner come on at some time in the future, say eight o'clock Wednesday morning, stay on during the day, after which it will be turned off at five o'clock Wednesday evening and remain off all day Thursday, the time switch will be set as follows: The "On" control lever 17 is positioned at the 8:00 a.m. position on the twenty-four hour dial, the "Off" control lever 23 is positioned at the 5:00 p.m. position on the twenty-four hour dial, and the dial is rotated until the 10:00 p.m. position on the dial is adjacent to the "Time" pointer on cover plate 4. The Thursday control pin T is pulled to its extreme outer position, control pin W is pushed to its extreme inner position, and the control disc 44 is rotated counterclockwise until the Tuesday operating pin T is positioned adjacent to the "Day" pointer on the cover plate. After this setting operation is performed, timing device 6 rotates dial 5 until at approximately four o'clock Wednesday morning the operating components of the time switch are in the position shown in Fig. 1. Upon further movement of time dial 5, control lever 17 engages Thursday operating pin T to rotate disc 43 counterclockwise to bring operating pin W into the position previously occupied by Tuesday operating pin T. Since operating pin W is in its innermost position, L-shaped first stop means 52 will engage the inner portion of operating pin W to thereby hold cam lever 32 up and out of the path of the control lever 17. As viewed in Fig. 4, as 8:00 a.m. Wednesday morning approaches, the end of control lever 17 moves clockwise to contact switch lever 16, 16', and moves lever 16 far enough to permit U-shaped spring 14 to snap the switch lever to the position shown in Fig. 4 to thereby close switch 10—12 and commence operation of the air conditioner. During the day of Wednesday, dial 5 moves clockwise and at 5:00 o'clock in the afternoon, dial 5 is in the position shown in Fig. 5. In this position, projection 25 on the "Off" lever 23 will contact projection 33 on lever 28 and move arm 30 counterclockwise to abut switch lever 16 and move the switch lever 16 far enough clockwise to allow U-shaped spring 14 to snap switch 10—12 to the open position shown in Figs. 3 and 5 to thereby stop operation of the air conditioner. During the remainder of Wednesday and the early hours of Thursday, timing device 6 continues to rotate timing dial 5 and the air conditioner remains off. At approximately 4:00 a.m. Wednesday morning, the control lever 17 connects the Friday operating pin F, which is then positioned in the second quadrant of disc 44, and rotates disc 44 counterclockwise, thus causing pin W to raise cam lever 32 against the tension of spring 31 and allow the cam lever stop notch 53 to drop down onto Thursday operating pin T. Since the Thursday operating pin T was pulled outwardly, the rearwardly extending L-shaped stop 52 merely passes behind operating pin T without engaging it. Now cam 39 is in the path of control lever 17 and at 8:00 o'clock Thursday morning, the control lever 17 engages the cam surface of cam 39 and is moved rearwardly behind actuating arm 16' of switch lever 16, and thus, slips by the switch lever without actuating it. The air conditioner remains in the "Off" position. At 5:00 p.m. Thursday, the downwardly extending projection 25 on the "Off" lever 23 again contacts outwardly extending projection 33 on furcated lever 26, thereby causing lever 26 to rotate counterclockwise. Since switch lever 16 is already in the "Off" position as shown in Fig. 7, arm 30 will merely rotate counterclockwise under the influence of "Off" control projection 25 and snap clockwise under the influence of spring 31 without touching the switch actuating lever 16. Thus, the desired operation of an air conditioner is conveniently performed by the improved time switch mechanism.

It is to be understood within the scope of this invention that various devices other than a switch may, of course, be actuated by the mechanism disclosed. For example, valves, variable condensers, variable resistances, solenoids and other such devices may be actuated by the switch actuator lever 16. It is also to be understood that the timer control set forth above may be used to control devices other than air conditioner units. The timer could control heating units, fans, and many other devices.

While there has been shown and described a particular embodiment of this invention, it will be obvious to those skilled in the art that various other changes and modifications can be made therein without departing from the scope of the invention, and therefore, it is aimed in the appended claims to cover all such changes and modifications as fall within the true spirit and scope of the invention.

What we claim as new and desire to secure by Letters Patent of the United States is:

1. In a timing device, a switch, a rotatable switch lever for operating said switch, a control lever continuously rotated in a path as a function of time by said timing device for actuating said switch lever to close said switch at a preselected time, and cam means movable into the path of said continuously rotated control lever for diverting said control lever out of said path at said preselected time to thereby prevent said control lever from operating said switch lever at the preselected time.

2. In a timing device, a switch, a rotatable switch lever for operating said switch, a control lever continuously rotated in a path as a function of time by said timing device for moving said switch lever to close the switch at a preselected time, a plural position cam lever, a cam fixed to said cam lever for selectively preventing said control lever from operating said switch lever, an operating pin manually movable to a first position or a second position, a first stop means on said cam lever for engaging the pin when said pin is in its first position to hold said cam out of the path of said control lever to thereby allow said control lever to actuate said switch lever, second stop means on said cam lever for engaging the pin when said pin is in its second position to locate said cam in the path of said control lever to thereby prevent said control lever from operating said switch lever.

3. In a timing device, a switch, a rotatable switch lever for operating said switch, a control lever continuously rotated in a path as a function of time by said timing device for moving said switch lever to close said switch at a preselected time, a plural position cam lever, a cam fixed to said cam lever for selectively preventing said control lever from operating said switch lever, an operating pin manually movable to an inner position or an outer position, spring means for urging said cam lever into engagement with said operating pin, first stop means on said cam lever for engaging the pin when said pin is in its inner position to hold said cam out of the path of said control lever to thereby allow said control lever to actuate said switch lever, second stop means on said cam lever for engaging the pin when said pin is in its outer position to locate said cam in the path of said control lever to thereby prevent said control lever from operating said switch lever.

4. In a timing device, a switch, a rotatable switch lever for operating said switch, a control lever continuously rotated in a path as a function of time by said timing device for operating said switch lever to close said switch at a preselected time, a plural position cam lever, a cam fixed to said cam lever for selectively preventing said control lever from actuating said switch lever, a disc, a plurality of operating pins mounted on said disc, each of said pins being manually movable to an inner position or an outer position on said disc, first stop means on said cam lever for engaging a selected one of said pins when said selected pin is in its inner position to thereby hold said cam out of the path of said control lever, second stop means on said cam lever for engaging said selected one of said pins when said pin is in its outer position to allow said cam to move into the path of said control lever to thereby prevent said control lever from operating said switch lever, and timed means for indexing said disc to permit said cam lever to engage each pin in succession.

5. In a timing device, a switch, a rotatable switch lever for operating said switch, a control lever continuously rotated in a path as a function of time by said timing device for operating said switch lever to close said switch at a preselected time, a plural position cam lever, a cam fixed to said cam lever for selectively preventing said control lever from actuating said switch lever, a disc, a plurality of operating pins mounted on said disc, leaf spring means for selectively holding said pins in an inner position or an outer position on said disc, first stop means on said cam lever for engaging a selected one of said pins when said pin is in its inner position to hold said cam out of the path of said control lever, second stop means on said cam lever for engaging said selected one of said pins when said pin is in its outer position to allow said cam to move into the path of said control lever to thereby prevent said control lever from operating said switch lever, said control lever engaging a different selected one of said operating pins upon each rotation thereof to thereby index said disc once upon each complete rotation of said control lever to thereby permit said cam lever to selectively engage a different one of said pins each time the disc is indexed from one position to a next succeeding position.

6. A control device comprising first and second control levers continuously rotated in separate concentric paths as a function of time, a switch, a switch lever rotatable in one direction to close said switch and in an opposite direction to open said switch, said switch lever being positioned in the path of said first control lever for permitting said first control lever to move said switch lever in one direction to close said switch at a preselected time, cam means movable into the path of said first continuously rotated control lever for moving said first control lever out of said path at said preselected time to thereby prevent said first control lever from operating said switch lever at said preselected time, a pivoted lever having its pivot point spaced from said switch lever, said pivoted lever having an arm thereon spaced in the path of said second control lever, said second control lever engaging said pivoted lever upon each rotation thereof to cause said pivoted lever to engage said switch lever to open said switch.

7. In a timing device comprising a switch, a rotatable switch lever for operating said switch, a control lever continuously rotated in a path as a function of time by said timing device for operating said switch lever to close said switch at a preselected time, a plural position cam lever, a cam fixed to said cam lever for selectively camming said control lever out of said path to thereby prevent said control lever from actuating said switch lever, a disc having a hub, a plurality of operating pins mounted on said disc, said pins being manually movable with respect to said disc, a groove formed in each one of said operating pins, a plurality of leaf springs each having two ends, one end of each of said leaf springs being positioned in the groove of a respective operating pin, and the other end of each of said leaf springs extending radially inwardly for engaging the hub of the disc whereby said pins may be selectively held in an inner position or an outer position, first stop means on said cam lever for engaging a selected one of said pins when said pin is in its inner position to hold said cam out of the path of said control lever, second stop means on said cam lever for engaging said selected one of said pins when said pin is in its outer position to allow said cam to move into the path of said control lever to thereby prevent said control lever from operating said switch lever.

8. An indexable day selector disc comprising two longitudinally spaced concentrically arranged plates, a hub fixed to each of said plates and positioned therebetween, a plurality of operating pins extending through said plates, said pins being manually movable with respect to said plates, an annular groove formed in each one of said operating pins, a plurality of leaf springs having two ends, one end of each of said leaf springs being positioned in the groove of a respective operating pin, and the other end of each of said leaf springs engaging the hub of the disc, and two spacers positioned between said plates for bowing said springs, whereby said pins may be selectively held in an inner position or an outer position.

References Cited in the file of this patent

UNITED STATES PATENTS

| | | |
|---|---|---|
| 2,034,178 | Flegel | Mar. 17, 1936 |
| 2,078,781 | Sprenger et al. | Apr. 27, 1937 |
| 2,236,297 | Reid | Mar. 25, 1941 |
| 2,300,513 | Lenehan | Nov. 3, 1942 |
| 2,505,573 | Prophet | Apr. 25, 1950 |
| 2,596,330 | Everhard | May 13, 1952 |
| 2,637,837 | Davidson | May 5, 1953 |
| 2,702,322 | Truesdell | Feb. 15, 1955 |
| 2,832,856 | Goodhouse | Apr. 29, 1958 |

OTHER REFERENCES

Design News, volume 12, #5, p. 32, March 1, 1957.